(12) United States Patent
Brown, Sr.

(10) Patent No.: US 10,336,549 B2
(45) Date of Patent: Jul. 2, 2019

(54) QUICK DISCONNECT ASSEMBLIES

(71) Applicant: Terry Michael Brown, Sr., Vincennes, IN (US)

(72) Inventor: Terry Michael Brown, Sr., Vincennes, IN (US)

( * ) Notice: Subject to any disclaimer, the term of this patent is extended or adjusted under 35 U.S.C. 154(b) by 0 days.

(21) Appl. No.: 15/958,887

(22) Filed: Apr. 20, 2018

(65) Prior Publication Data

US 2018/0305133 A1  Oct. 25, 2018

Related U.S. Application Data

(63) Continuation-in-part of application No. 15/492,565, filed on Apr. 20, 2017.

(60) Provisional application No. 62/394,990, filed on Sep. 15, 2016.

(51) Int. Cl.
*B65G 39/02* (2006.01)
*B65G 23/06* (2006.01)

(52) U.S. Cl.
CPC .............. *B65G 39/02* (2013.01); *B65G 23/06* (2013.01)

(58) Field of Classification Search
CPC ..................................................... B65G 39/02
See application file for complete search history.

(56) References Cited

U.S. PATENT DOCUMENTS 6,663,313 B2 * 12/2003 Lewis .................... F16D 1/096
                                                        403/369
9,415,943 B2 *  8/2016 Carrara ................. B65G 39/02

OTHER PUBLICATIONS

Feb. 1, 2018 Office Action issued in U.S. Appl. No. 15/492,565.

* cited by examiner

*Primary Examiner* — Gene O Crawford
*Assistant Examiner* — Lester Rushin, III
(74) *Attorney, Agent, or Firm* — Oliff PLC; R. Brian Drozd

(57) ABSTRACT

A quick release roller for a conveyor system is configured to permit easy maintenance and replacement of the rollers in the system. The roller includes first and second roller segments that may be cooperatively joined together around a mounting shaft carried by the conveyor. The segmented roller permits the quick release to be removed and attached to the conveyor without disassembly of other conveyor components supporting the roller. The quick release roller facilitates maintenance and service of the conveyor system while limiting operational downtime for the conveyor while being serviced.

20 Claims, 6 Drawing Sheets

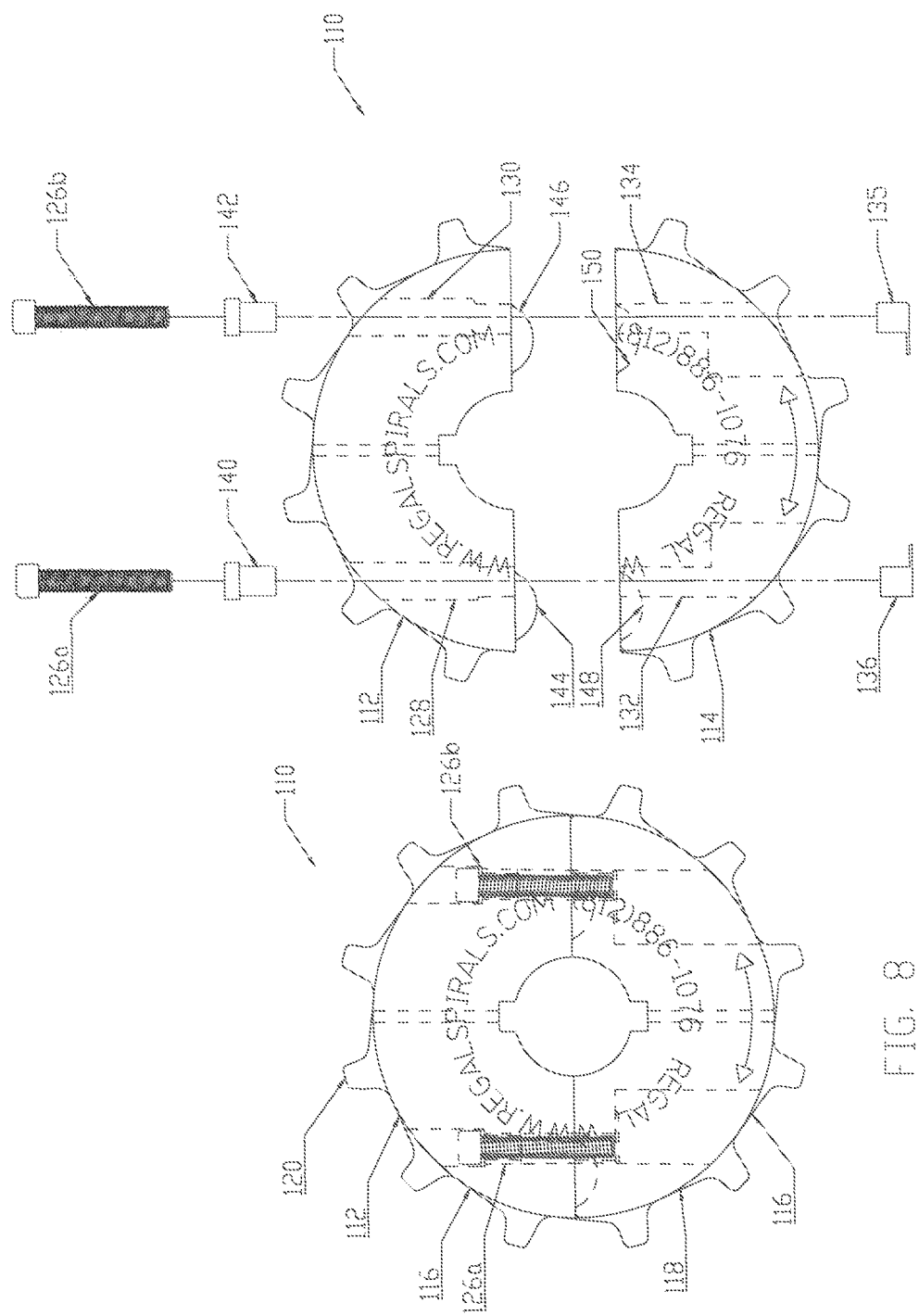

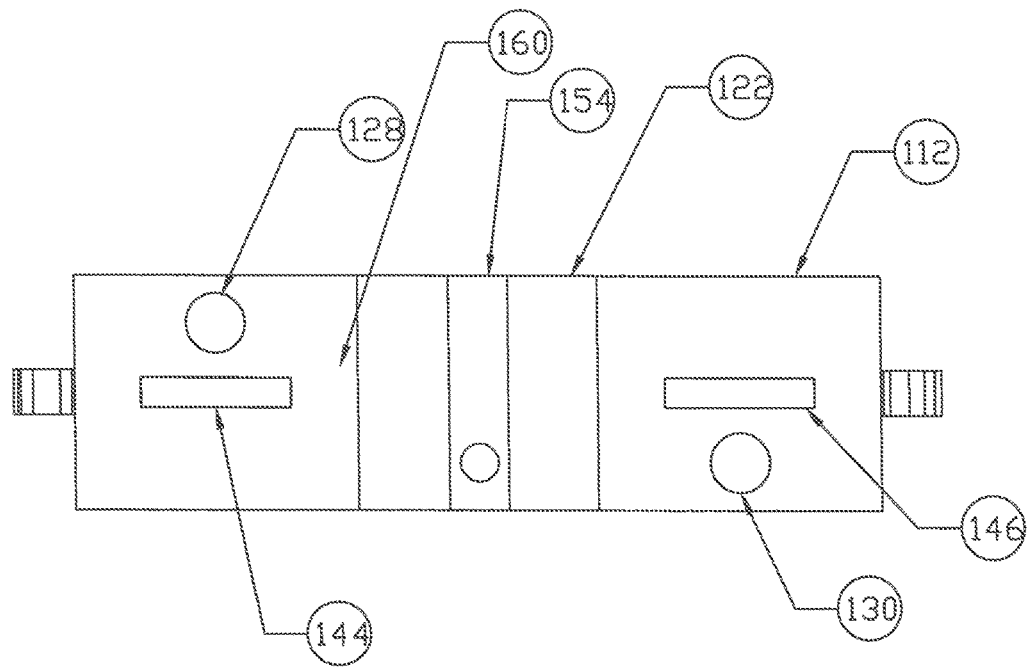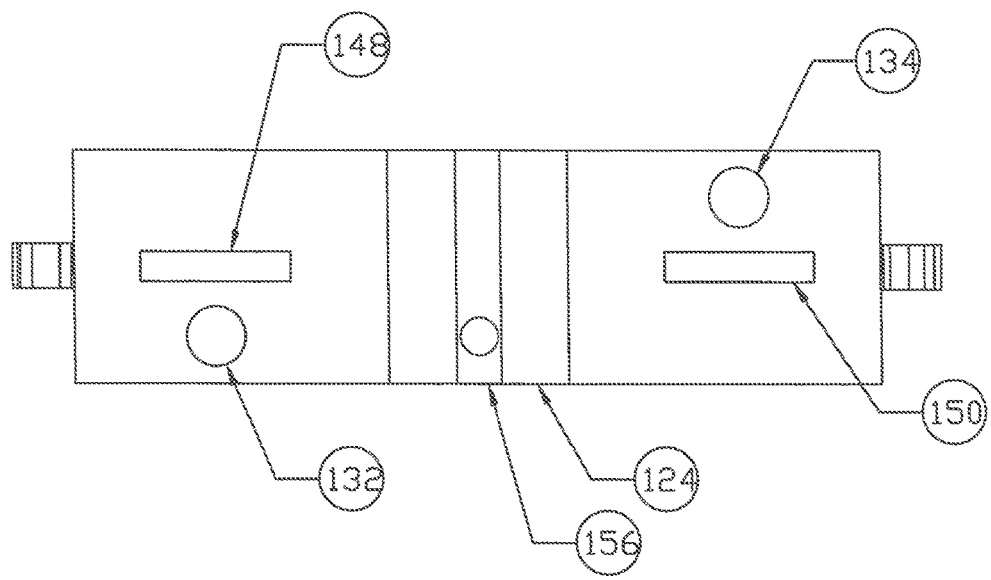
FIG. 11

QUICK DISCONNECT ASSEMBLIES

CROSS-REFERENCE TO RELATED APPLICATION

This application claims the benefit of priority of U.S. provisional application No. 62/394,990, filed Sep. 15, 2016, the contents of which are herein incorporated by reference. This application claims the benefit of priority of U.S. provisional application Ser. No. 15/492,565, filed Apr. 20, 2016, the contents of which are herein incorporated by reference.

BACKGROUND OF THE INVENTION

The present invention relates to quick disconnect assemblies, such as quick connect and disassemble rollers and sprockets for conveyor systems.

Conveyor systems currently include a plurality of rollers to support and carry an endless belt entrained about the rollers. Occasionally the rollers need maintenance or in the event of a failure, require replacement. Previous means of replacing rollers require the removal of a shaft and counterparts (ie. bolts, bearings, lock collars, and the like) associated with mounting the roller to the conveyor system. Servicing or replacement of these rollers requires that the conveyor system be brought off line for extended periods of time, thereby affecting production or distribution capabilities and throughput.

As can be seen, there is a need for quick connect and disassemble rollers to facilitate the servicing and replacement of rollers while reducing the downtime of the conveyor system to effectuate the repairs.

Also, there is a need for a drive sprocket assembly that can be replaced more quickly to minimize downtime. Moreover, there is a need to allow users to replace a drive sprocket and its corresponding parts more easily and efficiently.

SUMMARY OF THE INVENTION

In one aspect of the present invention, a quick release roller includes a first roller segment and a second roller segment configured to be joined along an opposing mating surface to form a cylindrical roller body. A cylindrical recess is defined in the opposed mating surface along an axis of rotation of the cylindrical roller body. At least one protrusion extends from the opposed mating surface, while at least one cooperating recess is formed in the opposed mating surface. The cooperating are configured to cooperatively engage with the at least one protrusion when the first roller segment and the second roller segment are joined as the cylindrical roller body. A plurality of aligned apertures extend through the opposed mating surface of each of the first roller segment and the second roller segment. A fastener may be received within the aligned apertures to join the first roller segment and the second roller segment.

In some embodiments, a countersink bore is formed in a first end of the aligned apertures and is configured to receive a head of the fastener. A bushing may also be received in the countersink bore. A plurality of threads may be defined in a second end of the aligned apertures. In some cases, a slot may be defined in a second end of the aligned apertures. A threaded insert, having a protruding tab, may be received in the second end of the aligned apertures and the protruding tab is oriented to engage within the slot.

In other embodiments, the first roller segment may include the at least one protrusion extending from the opposing mating surface; and the second roller segment may include at least one recess formed in the opposing mating surface. Similarly, the first roller segment may also include the at least one recess formed in the opposing mating surface and the second roller segment may include the at least one protrusion formed in the opposing mating surface.

An annular channel may be formed in an end face of each of the first roller segment and the second roller segment. The annular channel defines a hub oriented about the axis of rotation of the quick release roller.

Each of the first roller segment and the second roller segment are similar with some differences. In other instances, at least one annular flange radially extends about the axis of rotation from each of the first roller segment and the second roller segment. The annular flange may also extend from an end face of the first roller segment and the second roller segment. Each of the first roller segment and the second roller segment are semi-circular cylindrical bodies.

In other aspects, a roller assembly includes a first roller segment having a first outer arcuate surface, a first inner mating surface, and at least one protrusion extending from the first inner mating surface. A second roller segment includes a second outer arcuate surface, a second inner mating surface and at least one recess formed in the second inner mating surface. A semicircular cylindrical recess is defined in each of the first inner mating surface and the second inner mating surface along a common rotational axis. A plurality of aligned apertures extend through the first inner mating surface and the second inner mating surface. The first roller segment and the second roller segment are configured to be joined along the first inner mating surface and second inner mating surface with the at least one protrusion in cooperative engagement with the at least one recess.

A fastener can be received within the plurality of aligned apertures and is configured to join the first roller segment to the second roller segment. A countersink bore may extend into a first end of the plurality of aligned apertures, and is dimensioned to receive a head of the fastener. A slot may defined in a second end of the plurality of aligned apertures. A threaded insert having a protruding tab may be received within the second end of the plurality of aligned apertures and the protruding tab is configured to be received within the slot. At least one annular flange may be provided that radially extends about the common rotational axis from each of the first roller segment and the second roller segment.

These and other features, aspects and advantages of the present invention will become better understood with reference to the following drawings, description and claims.

BRIEF DESCRIPTION OF THE DRAWINGS

FIG. 8 is a schematic diagram showing a front elevation view of a split drive sprocket assembly, according to one embodiment.

FIG. 9 is an exploded schematic diagram showing a front elevation view of the split drive sprocket assembly of FIG. 8, according to one embodiment.

FIG. 11 is a diagram showing inner edge surfaces of the separated halves of the split drive sprocket assembly of FIG. 8, according to one embodiment.

DETAILED DESCRIPTION OF THE INVENTION

Figure 1:
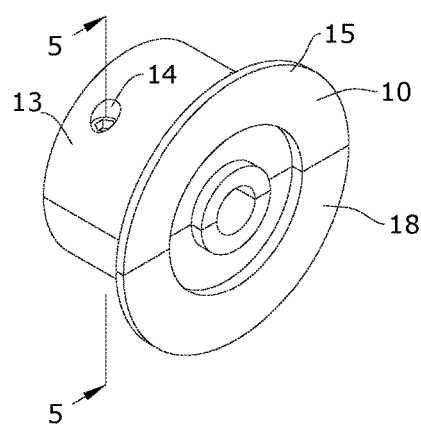
FIG. 1 is a perspective view of an embodiment of a quick disconnect roller.
Figure 2:
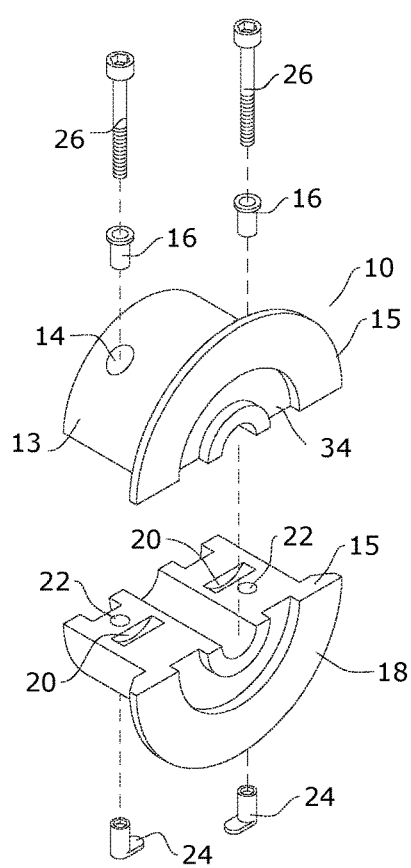
FIG. 2 is an upper exploded perspective view the quick disconnect roller.
Figure 3:
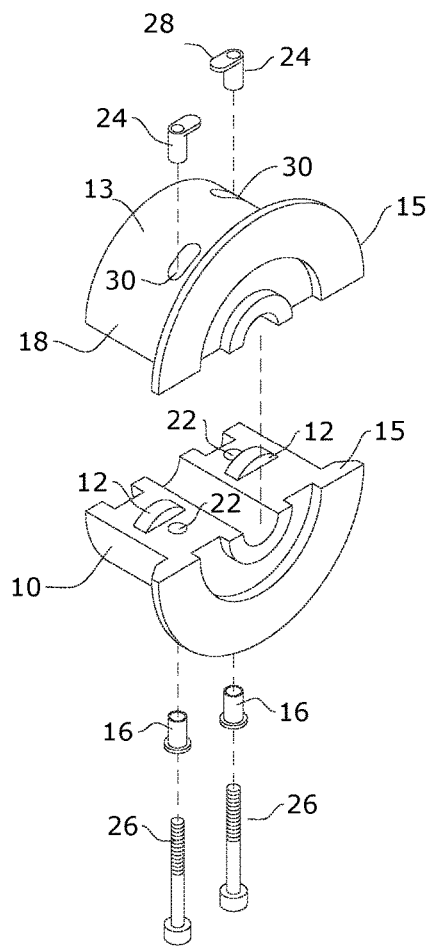
FIG. 3 is a lower exploded view of the quick disconnect roller.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following detailed description includes exemplary implementations of the invention. The description merely defines the general principles of the invention and is not intended to limit the invention, but should include other alternatives of which one of ordinary skill in the art will become aware from an understanding of the details of the following disclosure.

Broadly, the present disclosure describes embodiments of assemblies, such as drive sprocket assemblies, roller assemblies, assemblies with other functions, etc. For example, described herein are drive sprocket assemblies having a sprocket with a "split" construction including two or more separable pieces forming a wheel of the sprocket. With such a split configuration, the drive sprocket assembly can be quickly released from a shaft on which the drive sprocket assembly is attached during operation.

It should be understood that the present application is not limited to roller and sprocket assemblies and is directed to any device which can connect to an axle or other device and can be disconnected in at least two halves in order to be removed from the axle or other device. Described below is a construction of a roller assembly and a sprocket assembly in exemplary embodiments for ease of illustration.

Roller Assembly/Roller

First, embodiments of the present invention provide a readily serviceable quick disconnect roller for a conveyor system. The roller is amenable for use as an end roller or a center roller. The quick disconnect roller allows users to replace rollers and counterparts easily and efficiently.

Referring now to the Figures, quick disconnect roller includes a first roller segment 10 and a second roller segment 18 joined along an opposed inner mating surface. The first roller segment 10 and the second roller segment 18 have a respective outer arcuate surface 13. Preferably the first roller segment 10 and the second roller segment 18 are formed as semi-circular cylindrical bodies. The first and second roller segment 10, 18 are joined along the opposed inner mating surface to form a cylindrical roller body configured for axial rotation about a rotational axis of the roller to provide a supported conveyor surface. The conveyor surface may include an endless belt entrained about a plurality of rollers.

The first and second roller segment 10, 18 may include at least one annular flange 15 radially extending about the rotational axis of the roller.

The mating surface of the first roller segment 10 includes at least one protrusion 12 extending therefrom. The mating surface of the second roller segment 18 has at least one cooperating recess 20 defined therein, such that the at least one protrusion 12 and the at least one recess 20 are configured for cooperative engagement to provide for the alignment of the first roller segment 10 and the second roller segment 18 to form the cylindrical roller body. The at least one protrusion 12 and the at least one recess 20 are preferably formed in a keyed relation such that they may only cooperatively engage each other when the first roller segment 10 and the second roller segment 18 are positioned in a correct orientation.

As will be appreciated, the at least one protrusion 12 and the at least one recess 20 may also be formed in an opposite relation relative to the first roller segment 10 and the second roller segment 18. Similarly the first roller segment 10 and the second roller segment 18 may also be configured such that they each have at least one protrusion 12 and at least one cooperating recess 20.

Each of the first and second roller segment 10, 18 may include a plurality of aligned apertures 22 extending through the common face and configured to receive a fastener 26, such as a bolt, pin, or screw, for joining the first and second roller segment 10, 18. A first end of the aligned apertures 22 may include a countersink bore 14 to receive a head of the fastener 26. The countersink bore 14 may also be configured to receive a bushing 16.

It should be noted that the fasteners may be inserted into the sprocket segments 10, 18 along a centerline which is in a middle portion of each segment measured along an axial direction of rotation of the roller or roller axis of rotation. In this regard, the fasteners are then inserted at a location which has the highest strength for the roller as opposed to using fasteners on an outer periphery of the roller or a hub thereof.

A second end of the aligned apertures 22 may include a plurality of threads which may be formed within an interior surface of the aligned apertures 22 or may be provided by a threaded insert 24 received in the second end of the aligned apertures 22. The threaded insert 24 is configured with a plurality of internal threads for engagement with a plurality of external threads of the fastener 26. The threaded insert 24 may have a protruding tab 28 that is received within a corresponding slot 30 formed in the second end of the aligned apertures 22 to prevent rotation of the threaded insert 24 while threadingly receiving the fastener 26.

Each of the first roller segment 10 and the second roller segment 18 are provided a semicircular cylindrical recess 32 defined along the axis of rotation such that they may be joined about a shaft carried on the conveyor system. An end face of the first roller segment 10 and the second roller segment 18 may have an annular channel 34 formed around the axis of rotation to define a hub 36.

Depending on the application, the first roller segment 10 and the second roller segment 18 may be formed from any suitable material such as metal, plastics, polymeric materials, rubber, and elastomeric materials.

The quick release roller allows a user to remove the roller from a conveyor system for servicing or replacement without the need for the removal of conveyor shaft and associated counterparts. Once the roller is serviced, the roller may be reinstalled by simply joining the first roller segment 10 and the second roller segment 18 around the supporting conveyor shaft. As will be appreciated the quick release roller may be formed in various lengths, diameters, and hub radii depending upon the requirements of the conveyor system.

In some instances, such as where the roller does not have an annular flange 15 or has an annular flange 15 on opposed ends of the roller, the first roller segment 10 and second roller segment 18 may be similarly formed, which may be advantageous for limiting the number of parts that need to be manufactured, maintained in inventory, or carried by a maintenance technician servicing the conveyor system. Similarly the outer arcuate surface 13 may be formed in the shape of a cam having one or more lobes, gear, or other body rotationally carried on a shaft.

It should be noted that the configuration of the roller system allows for only two fasteners to be used in that no other fasteners may be required, in some embodiments. The two fasteners are inserted into the outer surface a segment 10 of the roller and this outer surface is the surface that the belt (not shown) of a conveyor belt will attach on the roller when in operation. As such, in one embodiment, the fastener head and insert (or other parts used to fasten the two segments 10, 18 together) do not extend radially outwardly to make contact with the belt when the belt is rolling around the roller.

Moreover, it is noted that the fasteners and insert combination allows for a tight connection between the segments 10, 18 relative to using a screw/nut combination because the insert has more threads and is longer than a common nut thereby allowing there to be more forces applied between the segments to hold the segments together. This allows one to have a tighter tension on a belt relative to previous systems.

It should also be noted that the material for the roller may be UHMW polyethylene or any other like material (including materials other than metal). This allows for better use in food industry since this material is strong and does not sheer shards of metal like a metal roller may.

It is noted that the roller used here may be a solid roller and part of the roller is removed (see annular channel 34) in order to lighten the roller but not compromise the strength of the roller.

Sprocket Assembly/Sprocket

The below embodiments describe a drive sprocket assembly/sprocket. As mentioned above, the sprocket assembly/sprocket is merely an exemplary embodiment of the present application and aspects thereof are explained below. It should be understood that the sprocket assembly/sprocket according to some embodiments are two halves that are connected together and may be connected together in the same manner that the roller is connected together. Thus, some embodiments the sprocket is attached together using the same methodology, construction, and parts (i.e., fastener 26, bushing 16, an insert 24—which correspond to fastener 126, bushing 116, an insert 124 in the below explanations). However, in one embodiment, the first and second segments 112, 114 of sprocket are different from are different from the first and second segments 10, 18 of roller because the first and second segments 112, 114 of the sprocket have teeth and notches 154, 156 so that an axle can rotate the sprocket. However, it should be noted that a roller may also have teeth and notches similar to the sprocket and the roller should not be limited.

Also, it should be noted that the roller and/or sprocket embodiments may or may not have flange 15.

The construction of the drive sprocket assembly allows operation in an engaged condition when the pieces of the sprocket are connected together and connected to the shaft.

The construction of the drive sprocket assembly also enables a disengaged or disassembled condition when the pieces are separated from each other and from the shaft to allow the replacement of the drive sprocket, which can be done without removing the shaft or its corresponding parts.

FIG. 8 is a schematic diagram showing a front elevation view of an embodiment of a split drive sprocket assembly 110. FIG. 8 shows the split drive sprocket assembly 110 in a connected or engaged configuration where a male sprocket portion 112 is connected to a female sprocket portion 114. Each of the portions 112, 114 may include a plurality of teeth 120 or cogs equally spaced apart from each other along their respective circumferential surfaces 116, 118. The teeth 120 may be dimensioned and adapted so as to drive a belt (not shown) of a conveyor system. In some embodiments, the teeth 120 may include a slide (not shown) that would not drive other components.

The male sprocket portion 112 and female sprocket portion 114 are assembled together (e.g., assembled on a shaft) to form the split drive sprocket assembly 110. The male sprocket portion 112 includes a first inner curved surface 122 and the female sprocket portion 114 includes a second inner curved surface 124. Together, the first and second inner surfaces 122, 124 define a cylindrical surface defining an axis x. The axis x also corresponds to the axis of rotation of the split drive sprocket assembly 110 and the shaft (not shown) that is configured to drive the split drive sprocket assembly 110.

Also shown in FIG. 8 are fasteners 126, such as bolts, having spiral ridges for engaging with corresponding inside ridges of bores in the male and female sprocket portions 112, 114. Although shown in FIG. 8, it should be noted that the fasteners 126 and bores are located within an inside portion of the male and female sprocket portions 112, 114. In other embodiments, the fasteners 126 may be configured to engage with one or more inserts contained within each of the bores in either or both of the male and female sprocket portions 112, 114, as described in more detail with respect to FIG. 9.

FIG. 9 is an exploded schematic diagram showing a front elevation view of the split drive sprocket assembly 110 of FIG. 8, where the split drive sprocket assembly 110 is shown in its disengaged or disassembled condition. The split drive sprocket assembly 110 is configured with a number of bores. For example, the male sprocket portion 112 includes a first bore 128 (shown in phantom) for receiving a first fastener 126a and a second bore 130 (also shown in phantom) for receiving a second fastener 126b. The female sprocket portion 114 includes a third bore 132 (shown in phantom) for receiving the first fastener 126a and a fourth bore 134 for receiving the second fastener 126b. As mentioned above, the fasteners 126 may be configured to engage with ridges on the inside surfaces of the bores 128, 130, 132, 134.

In some embodiments, the bores 128, 130, 132, 134 may be configured without ridges, but may be configured to accommodate inserts that are fixed with the fasteners 126. For example, a first insert 140 may be inserted in the first bore 128 and a second insert 142 may be inserted in the second bore 130 of the male sprocket portion 112. Also, a third insert 136 may be inserted in the third bore 132 and a fourth insert 135 may be inserted in the fourth bore 134 of the female sprocket portion 114. At least the third and fourth inserts 135, 136 include a tab on one side and insides surfaces with ridges corresponding to the ridges of the fasteners 126 for enabling a secure connection. The inserts 136, 138, 140, 142 may be fixedly attached within the bores 128, 130, 132, 134, such that the fasteners 126 can connect the sprocket portions 112, 114 together.

The first and third bores 128, 132 are aligned when the sprocket assembly 110 is assembled so that fastener 126a extends through the respective bores in a direction that is transverse to the axis x of rotation of the shaft. The second and fourth bores 130, 134 are also aligned when the sprocket assembly 110 is assembled so that fastener 126b extends through the respective bores in a direction that is also transverse to the axis x of rotation of the shaft.

Figure 4:
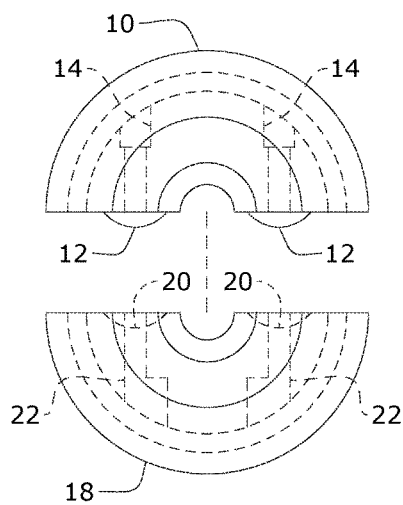
FIG. 4 is a front elevation view illustrating a first roller segment and a second roller segment.
Figure 5:
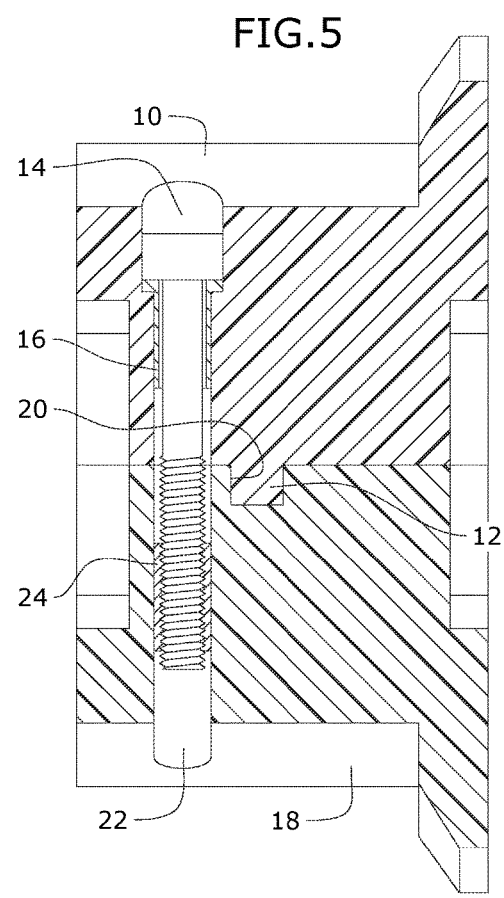
FIG. 5 is a side section view of the quick disconnect roller taken along line 5-5 in FIG. 1.
Figure 6:
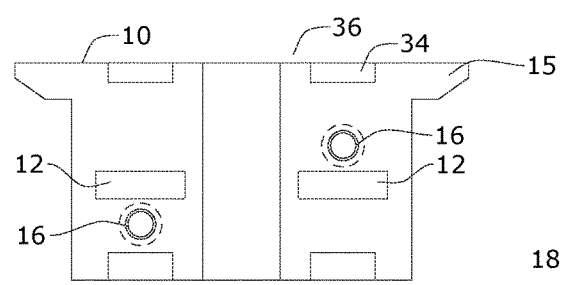
FIG. 6 is an interior mating face view of a first roller section.
Figure 7:
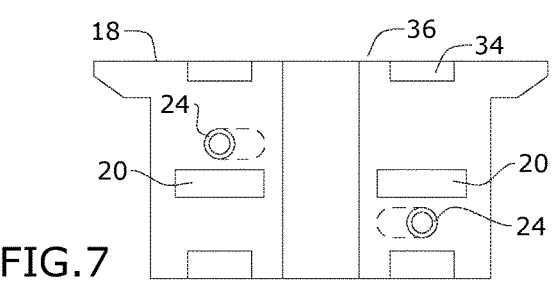
FIG. 7 is an interior mating face view of a second roller section.

It should be noted that, in one embodiment, the bores shown on the sprocket may have a configuration as shown in FIG. 4 where there is a shoulder which allows for the insert to make contact with. The shoulder is shown on both segments 10, 18 and prevents the insert and head of the fastener from moving radially toward the center of the sprocket/roller.

Also shown in FIG. 9 are engagement elements for engaging the male sprocket portion 112 with the female sprocket portion 114. The male sprocket portion 112 includes tabs 144 and 146, which are configured to be inserted within indentations 148 and 150, respectively, of the female sprocket portion 114 in the assembled condition.

The bores 128 and 132 are oriented in a direction that is perpendicular to the rotational axis x and is offset from the axis x such that the bores 128, 132 do not intersect the axis x. Also, bores 130 and 134 are oriented in a direction that is perpendicular to the rotational axis x and in some embodiments may be parallel with the direction of the bores 128, 132. Also, the direction of bores 130, 134 is also offset from the axis x such that the bores 130, 134 do not intersect the axis x.

Figure 10:
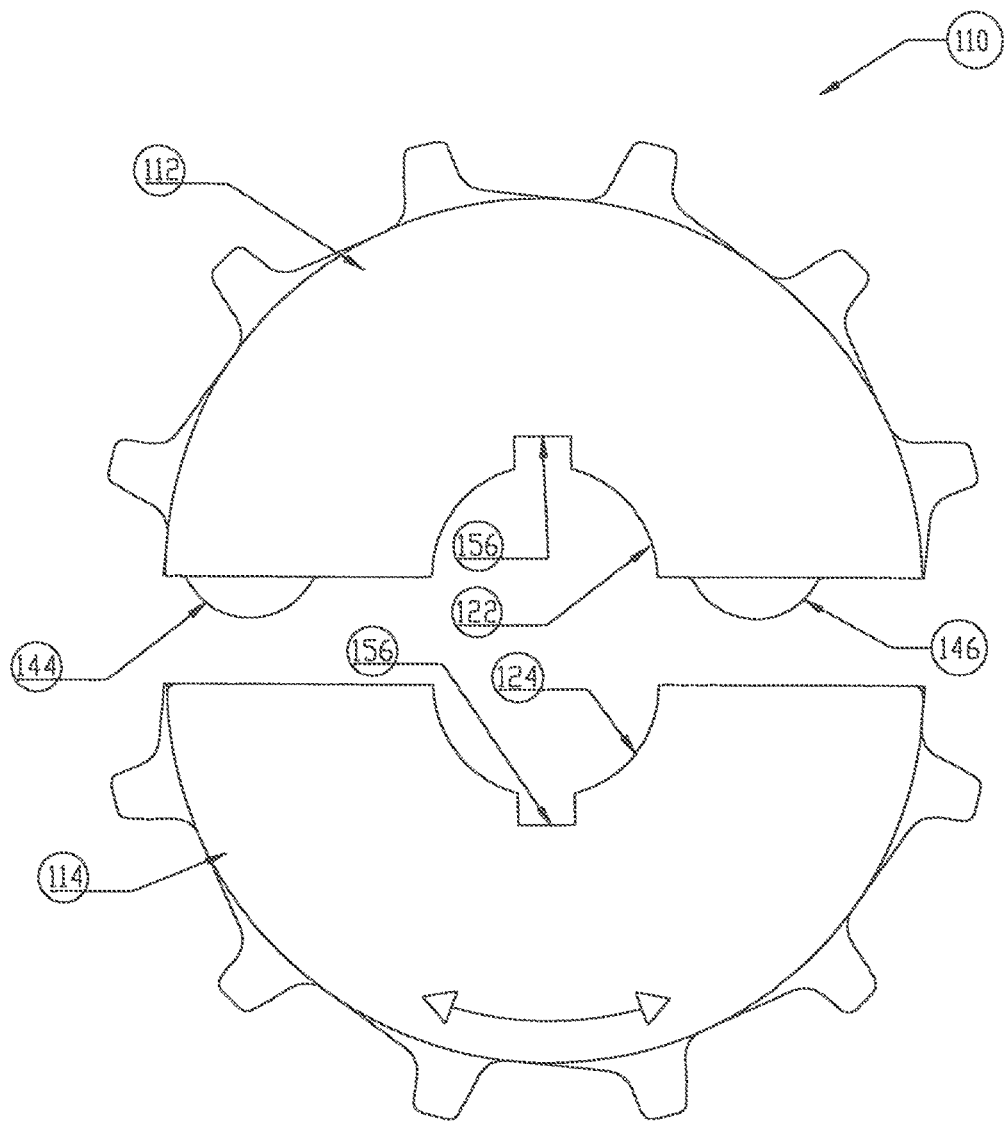
FIG. 10 is a diagram showing a front elevation view of the separated halves of the split drive sprocket assembly of FIG. 8, according to one embodiment.

FIG. 10 is a diagram showing a front elevation view of the separated halves of the split drive sprocket assembly 110. The first inner curved surface 122 of the male sprocket portion 112 includes a first notch 154 that is configured to engage with a step portion of a shaft. Also, the second inner curved surface 124 of the female sprocket portion 114 includes a second notch 156 that is configured to engage with another step portion of the shaft.

FIG. 11 is a diagram showing inner edge surfaces of the separated halves of the split drive sprocket assembly 110. The male sprocket portion 112 includes an inner edge surface 160. The tabs 144 and 146 protrude from the inner edge surface 160. Also, the female sprocket portion 114 includes an inner edge surface 162. The indentations 148 and 150 are formed below the inner edge surface 162. The inner edge surfaces 160 and 162 are generally complementary and include the inner curved surface 122 and 124, respectively, wherein the inner curved surfaces 122 and 124 are bookended by first and second portions of the inner edge surfaces 160 and 162, respectively. When the sprocket assembly 110 is assembled, the inner curved surfaces 122, 124 (or shaft cutouts) form an opening for rotatably receiving a shaft so that the sprocket assembly 110 rotates on the shaft.

When the sprocket assembly 110 is assembled, the respective opposing end sections of the inner edge surfaces 160 and 162 interface with each other. Such interface results in a secure engagement because the two sides of the inner edge surface 160 of the male sprocket portion 112 include the tabs 144, 146 (or protrusions) that snugly nest in the corresponding indentations 148, 150 (or recesses) provided in the two sides of the inner edge surface 162 of the female sprocket portion 114. This arrangement provides a removable connection between the sprocket portions 112 and 114, preventing them from separating and moving relative to one another, both axially and radially.

Figure 12:
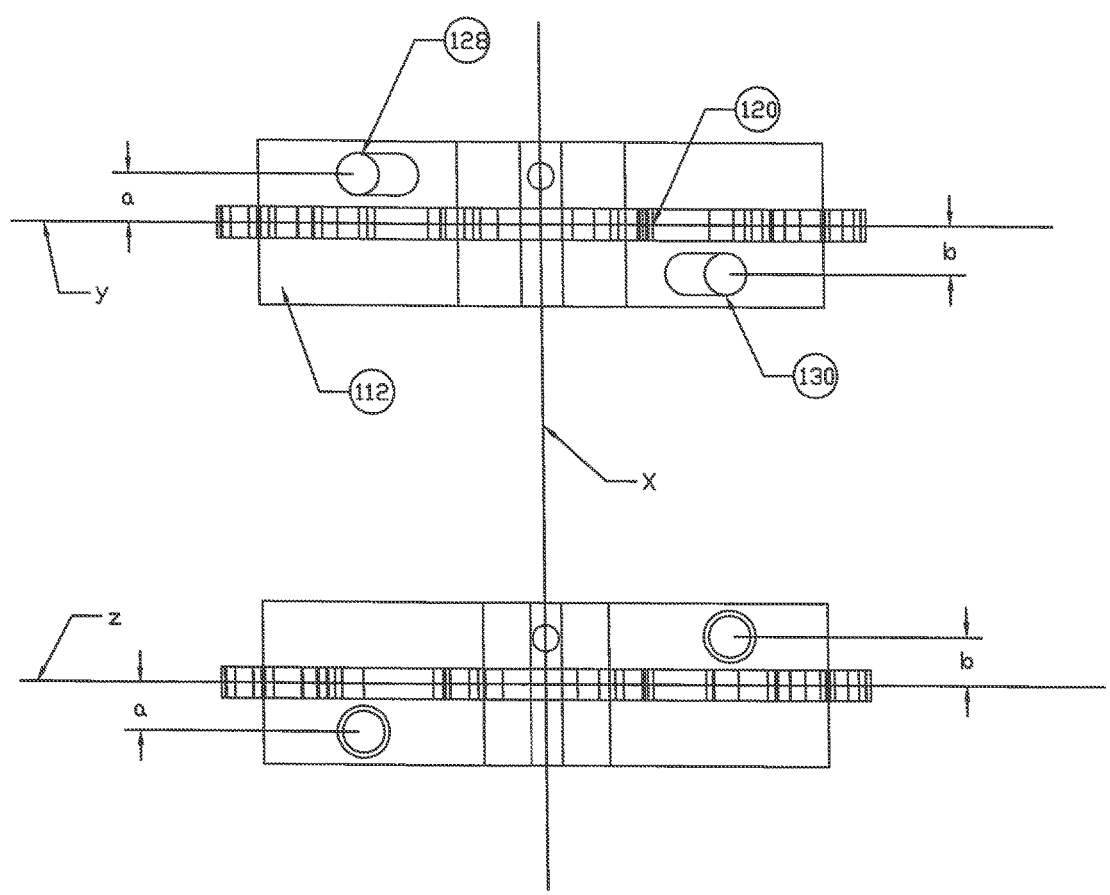
FIG. 12 is a diagram showing outer edge surfaces of the separated halves of the split drive sprocket assembly of FIG. 8, according to one embodiment.

FIG. 12 is a diagram showing outer edge surfaces of the separated halves of the split drive sprocket assembly 110. The male sprocket portion 112 is defined by a center radial plane y and female sprocket portion 114 is defined by a center radial plane z. When assembled, the planes y and z are configured to be aligned and will be substantially perpendicular to the rotational axis x.

On the male sprocket portion 112, the first bore 128 is shown being offset in a first direction by a distance "a" from the y plane and the second bore 130 is offset in a second, opposite direction by a distance "b" from the y plane. In some embodiments, a=b. Likewise, on the female sprocket portion 114, the third bore 132 is shown being offset in the first direction by the distance "a" from the z plane and the fourth bore 130 is offset in the second direction by the distance "b" from the z plane. Therefore, the bores 128 and 130 of the male sprocket portion 112 are positioned on opposite sides of the center radial plane y and the bores 132 and 134 of the female sprocket portion 114 are positioned on opposite sides of the center radial plane z.

An assembling method of using the sprocket assembly 110 disclosed above may include the following. A user (e.g., repair technician) may simply place the male and female sprocket portions 112 and 114 around a shaft so that the tabs or protrusions 144, 146 snugly nest in the corresponding indentations or recesses 148, 150. Then, the user inserts the first fastener 126a in the bores 128, 132 and inserts the second fastener 126b in bores 130, 134.

A disassembling method may be needed when the drive sprocket or any of the corresponding parts need to be replaced. In this method, the user may remove the fasteners 126a, 126b and pull the male and female sprocket portions 112 and 114 apart from each other.

It should be noted that the insert can be interchanged with a double threaded insert which is allowed to be screwed into the segment until it reaches the shoulder which locks it into place. Also, the bushing can be replaced with either of these inserts and the particular configuration is not limited to the explicit embodiments shown herein.

The split drive sprocket assembly 110 can be used in a conveyor system for driving a conveyor belt. Other uses of such a split drive sprocket assembly 110 may involve any conveyor or drive system including in the fields of agriculture, pharmacies, hospitals, factories, etc. The implementations may also include quick disconnect pillow block bearings, quick disconnect rollers, quick disconnect 2 bolt flange bearings, quick disconnect 4 bolt flange bearings, or other uses.

The above description defines various embodiments of a quick release split drive sprocket assembly, allowing a user to replace a drive sprocket and its corresponding parts easily and efficiently. It should be understood that the foregoing description relates to exemplary embodiments of the invention and that modifications may be made without departing from the spirit and scope of the present invention.

It should be understood, of course, that the foregoing relates to exemplary embodiments of the invention and that modifications may be made without departing from the spirit and scope of the invention as set forth in the following claims.

What is claimed is:
1. A quick release apparatus, comprising:
  a first roller segment and a second roller segment configured to be joined along an opposing mating surface to form a body configured to rotate about an axis;

a plurality of aligned apertures extending through the opposed mating surface of each of the first roller segment and the second roller segment, the plurality of aligned apertures comprising a first aligned aperture of the aligned apertures defined in the second roller segment; and a threaded insert that is configured to be received in the first aligned aperture, wherein the threaded insert is threaded to receive a fastener through an aperture of the first roller segment, thereby securing the first and second roller segments together and fixing the insert within the second roller segment.

2. The quick release apparatus of claim 1, further comprising:

a fastener received within the first aligned aperture to secure the first roller segment with the second roller segment.

3. The quick release apparatus of claim 2, further comprising:

a countersink bore formed in a second end of the aligned apertures configured to receive a head of the fastener.

4. The quick release apparatus of claim 3, further comprising:

a bushing received in the countersink bore.

5. The quick release apparatus of claim 1, wherein the threaded insert comprises a protruding tab that is configured to engage within the slot to lock the insert within the second roller segment.

6. The quick release apparatus of claim 1, wherein the threaded insert comprises a protruding tab, wherein the threaded insert is received in the first end of the first aligned aperture and the protruding tab is configured to engage within the slot to lock the insert within the second roller segment.

7. The quick release apparatus of claim 1, further comprising:

a cylindrical recess defined in the opposed mating surface along the axis;

at least one protrusion extending from the opposed mating surface; and at least one cooperating recess formed in the opposed mating surface, configured to cooperatively engage with the at least one protrusion when the first roller segment and the second roller segment are joined as the cylindrical roller body, wherein the first roller segment includes the at least one protrusion extending from the opposing mating surface; and the second roller segment includes at least one recess formed in the opposing mating surface.

8. The quick release apparatus of claim 7, wherein:

the first roller segment includes the at least one recess formed in the opposing mating surface; and the second roller segment includes the at least one protrusion formed in the opposing mating surface.

9. The quick release apparatus of claim 1 further comprising:

an annular channel formed in an end face of each of the first roller segment and the second roller segment, the annular channel defining a hub oriented about the axis of rotation of the quick release roller.

10. The quick release apparatus of claim 1, wherein each of the first roller segment and the second roller segment mate together to form a roller.

11. The quick release apparatus of claim 1, further comprising at least one annular flange radially extending about the axis of rotation from each of the first roller segment and the second roller segment.

12. The quick release apparatus of claim 11, wherein the annular flange extends from an end face of the first roller segment and the second roller segment.

13. The quick release apparatus of claim 1, wherein each of the first roller segment and the second roller segment are semi-circular cylindrical bodies.

14. A system, comprising:

a first roller segment comprising a first outer arcuate surface and a first inner mating surface;

a second roller segment comprising a second outer arcuate surface and a second inner mating surface; and a plurality of aligned apertures extending through the first inner mating surface and the second inner mating surface, wherein the first roller segment and the second roller segment are configured to be joined along the first inner mating surface and second inner mating surface; and a body surface configured to directly support a conveyor belt to roll thereupon, the roller body surface: (1) having the plurality of aligned apertures extending through the body surface where the conveyor belt is directly supported and (2) configured to receive a fastener through the body surface.

15. The system of claim 14, further comprising:

a fastener received within the plurality of aligned apertures configured to join the first roller segment to the second roller segment.

16. The system of claim 15, further comprising:

a countersink bore extending into a first end of the plurality of aligned apertures, dimensioned to receive a head of the fastener.

17. The system of claim 16, further comprising:

a slot defined in a second end of the plurality of aligned apertures; and a threaded insert received comprising a protruding tab, wherein the threaded insert is received within the second end of the plurality of aligned apertures and the protruding tab is received within the slot.

18. The system roller assembly of claim 17, further comprising:

a semicircular cylindrical recess defined in each of the first inner mating surface and the second inner mating surface along a common rotational axis, the first roller segment comprising at least one protrusion extending from the first inner mating surface, the second roller segment comprising at least one recess formed in the second inner mating surface, and the first roller segment and the second roller segment are configured to be joined along the first inner mating surface and second inner mating surface with the at least one protrusion in cooperative engagement with the at least one recess.

19. The system of claim 17, wherein:

at least one annular flange radially extends about a common rotational axis from each of the first roller segment and the second roller segment.

20. A quick release system, comprising:

a first roller segment and a second roller segment configured to be joined together; and a plurality of aligned apertures extending to a joining surface of each of the first roller segment and the second roller segment, wherein the plurality of aligned apertures are configured such that fasteners and corresponding inserts which connect to the fasteners (1) are fully received in the plurality of aligned apertures in a direction intersecting the axis and (2) do not extend above a conveyor belt surface of the roller where a conveyor belt surface will be supported thereabove.

\* \* \* \* \*